Aug. 24, 1926.
S. A. FIRIN ET AL
1,597,442
INFLAMMABLE COMPOSITION
Filed Feb. 8, 1926
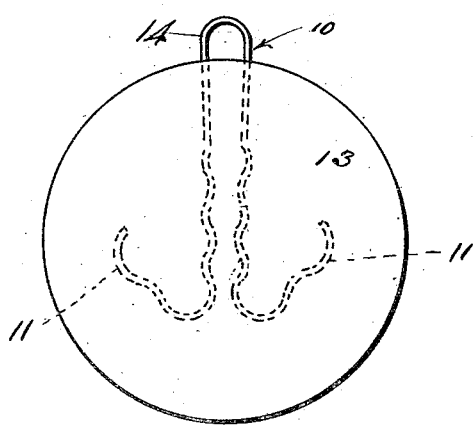
Inventors
Samuel A. Firin
and William H. Willson
by
their Attorney Patented Aug. 24, 1926.

1,597,442

UNITED STATES PATENT OFFICE.

SAMUEL A. FIRIN AND WILLIAM H. WILLSON, OF LOS ANGELES, CALIFORNIA.

INFLAMMABLE COMPOSITION.

Application filed February 8, 1926. Serial No. 86,782.

This invention relates to a composition of matter and has particular reference to a combustible composition for use as an igniter or for starting combustion of other compositions or materials.

It is an object of the present invention to provide a composition which will burn readily and for a comparatively long time.

Various materials used or burned for heat or other purposes are slow to ignite and ordinarily require considerable time and attention on the part of an attendant. We will cite, for example, heavy fuel oils, briquets, for instance carbon or coal dust briquets, etc. Further, we will refer to an orchard heater, or the like, as an example of apparatus in which it is desirable to ignite fuel such as we have referred to quickly and without continued attention of an operator. In referring to these particular materials and to this particular type of apparatus we do not wish to be understood as limiting or restricting the use or range of application of the present composition.

It is an object of the present invention to provide a composition which will ignite readily and will burn for a long time at a temperature sufficient to ignite ordinary feuls such as heavy fuel oils, briquets, etc.

Another object of the invention is to provide a composition of the character specified which is simple and inexpensive to manufacture.

It is a further object of this invention to provide a composition of the character mentioned which is safe and convenient to handle.

Another object of the invention is to provide a combustible composition suitable for the use specified which is not affected by moisture.

It is another object of this invention to provide a form for a composition of the character herein set forth particularly useful for igniting orchard heaters and the like.

The various objects and features of the invention will be best and more fully understood from the following detailed description of a typical application or embodiment thereof, throughout which description reference is had to the accompanying drawings, in which the figure illustrates a body of the composition in a form provided by certain features of this invention.

The composition provided by this invention includes a nitronaphthalene, a material to support combustion, for instance a wax, and preferably a binder. Various nitronaphthalenes may be used in carrying out our invention it being preferred to use trinitronaphthalene as it forms with paraffin wax, a composition which burns at a rate suitable for most purposes. In practice it is practical to use paraffin wax as the material to support combustion. I may, however, use other materials, for instance mineral wax.

The composition is formed by melting the nitronaphthalene and wax together. In practice the nitronaphthalene and wax are melted together in a closed vessel, in which they are brought to a temperature of about 300° F. The particular proportioning of wax and nitronaphthalene may in practice be varied somewhat, it being preferred however that they be mixed in about equal parts by weight.

For general commercial use it is desirable to provide the composition with a binder so that the material may be effectively held in cakes or blocks of suitable size. The particular binder employed may vary with the particular use to which the composition is to be put and with market conditions. Various materials can be used as a binder, for example we may use sawdust, cloth, cotton, etc. The binder is preferably added to or mixed with the wax and nitronaphthalene to be present in the melted composition so that it absorbs the composition. For example, we have found it practical to mix the binder, for instance cotton, with the wax and nitronaphthalene in the vessel in which the composition is melted, so that the binder becomes saturated with the composition, whereupon excess composition is drained from the binder and the saturated binder made into the desired form. By this method we have obtained about the proper proportion of composition to binder and we have found that the binder thus applied is particularly effective in holding the finished bodies in form.

Further, in accordance with our invention we prefer to form the bodies of the composition with means whereby they can be conveniently and effectively suspended as in a heater, or the like. For this purpose we have provided a U-shaped metal strip 10, for instance a wire, with its end portion crimped and if necessary bent back to form hook like parts 11. The metal strip is imbedded in the body 13 of the composition so that only the loop 14 projects from the body. The loop part 14 thus forms an eyelet like part by which the body can be easily suspended, and the crimping and hook parts 11 operate to effectively hold the body on the metal. The size and shape of the body 13 employed in any particular case will, of course, vary with the conditions of use.

In using the composition it may be handled without danger of explosion and without danger of its becoming spoiled by exposure to moisture. It may be readily ignited by an open flame, electric spark, or the like, and when ignited will continue to burn slowly and with considerable heat for a long period of time. In practice when employing the composition to ignite an orchard heater, or the like, the body 13 is suspended over the fuel, for instance heavy fuel oil, so that the burning composition drops from the body onto the oil where it continues to burn and is particularly effective in igniting the oil. We have found by actual test that this composition will ignite fuel oil in orchard heaters under conditions that make other methods of ignition practically impossible.

Having described only a typical preferred form of our invention we do not wish to limit ourselves to the specific details set forth, but wish to reserve to ourselves any changes or variations that may appear to those skilled in the art or fall within the scope of the following claims.

Having described our invention we claim:

1. An inflammable composition comprising a nitronaphthalene and wax.
2. An inflammable composition comprising a nitronaphthalene and paraffin wax.
3. An inflammable composition comprising a nitronaphthalene and wax in about equal parts by weight.
4. An inflammable composition comprising trinitronaphthalene and wax.
5. An inflammable composition comprising trinitronaphthalene and paraffin wax.
6. An inflammable composition comprising trinitronaphthalene and paraffin wax in about equal parts by weight.
7. An inflammable composition comprising a nitronaphthalene and wax melted together.
8. An inflammable composition comprising trinitronaphthalene and paraffin wax melted together at about three hundred degrees Fahrenheit.
9. An inflammable composition comprising a nitronaphthalene, wax, and a binder.
10. An inflammable composition comprising a binder saturated with nitronaphthalene and wax.
11. A body of nitronaphthalene and wax and a metal part embedded in the body and having a part projecting therefrom whereby the body can be suspended.
12. A body of nitronaphthalene and wax and a wire bent to form an eyelet and having its end portions embedded in the body and shaped to hold the body.

In witness that we claim the foregoing we have hereunto subscribed our names this 12th day of January, 1926.

WILLIAM H. WILLSON.
SAMUEL A. FIRIN.